United States Patent
Nagata et al.

(10) Patent No.: US 8,676,488 B2
(45) Date of Patent: Mar. 18, 2014

(54) VEHICLE SURROUNDING MONITOR DEVICE AND METHOD FOR MONITORING SURROUNDINGS USED FOR VEHICLE

(75) Inventors: Shinichi Nagata, Yokohama (JP); Jun Sakugawa, Gotenba (JP); Masahiro Iwasaki, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 162 days.

(21) Appl. No.: 13/321,326

(22) PCT Filed: Jun. 4, 2009

(86) PCT No.: PCT/JP2009/060278
§ 371 (c)(1),
(2), (4) Date: Nov. 18, 2011

(87) PCT Pub. No.: WO2010/140239
PCT Pub. Date: Dec. 9, 2010

(65) Prior Publication Data
US 2012/0065841 A1 Mar. 15, 2012

(51) Int. Cl.
*G08G 1/16* (2006.01)
*B60R 21/00* (2006.01)
*G01S 13/93* (2006.01)

(52) U.S. Cl.
USPC .............................. 701/301; 701/36; 340/435

(58) Field of Classification Search
None
See application file for complete search history.

(56) References Cited

U.S. PATENT DOCUMENTS 7,664,600 B2  2/2010  Takeichi et al.
2009/0265061 A1  10/2009  Watanabe et al.

FOREIGN PATENT DOCUMENTS

| CN | 101342892 | | 1/2009 |
|---|---|---|---|
| EP | 1 361 118 | | 11/2003 |
| EP | 1640746 | A2 * | 3/2006 |
| EP | 2 015 276 | | 1/2009 |
| JP | H05-126948 | | 5/1993 |
| JP | 2000-310677 | | 11/2000 |
| JP | 2001-126195 | | 5/2001 |

(Continued)

OTHER PUBLICATIONS

Translation of the International Preliminary Report on Patentability for PCT/JP2009/060278 dated Dec. 15, 2011.

*Primary Examiner* — Michael J Zanelli
(74) *Attorney, Agent, or Firm* — Finnegan, Henderson, Farabow, Garrett & Dunner, LLP

(57) ABSTRACT

A vehicle surrounding monitor device 10 includes a front area millimeter-wave radar 11 to a left dead angle millimeter-wave radar 18 which monitor different areas around a host vehicle 100, a vehicle speed sensor 21 and the like which detect the traveling state of the host vehicle 100, a winker signal sensor 31 which detect the state of a driver, and an obstacle detection method determination ECU 41 which controls the operation of the front area millimeter-wave radar 11 and the like and information processing. The obstacle detection method determination ECU 41 sets priority on the front area millimeter-wave radar 11 and the like on the basis of the traveling state of the host vehicle 100 and the state of the driver detected by the vehicle speed sensor 21, the winker signal sensor 31, and the like, and controls the operation of the front area millimeter-wave radar 11 and the like and the information processing on the basis of the priority. Therefore, control differs between a radar having high priority and a radar having low priority, such that, even when a plurality of radars are used, it becomes possible to monitor the surroundings the host vehicle 100 while reducing the load of a CPU or an in-vehicle LAN.

12 Claims, 5 Drawing Sheets

(56) References Cited

FOREIGN PATENT DOCUMENTS

| | | | |
|---|---|---|---|
| JP | 2003-329773 | | 11/2003 |
| JP | 2004-45320 | * | 2/2004 |
| JP | 2005-056336 | | 3/2005 |
| JP | 2005-100232 | | 4/2005 |
| JP | 2005-100337 | | 4/2005 |
| JP | 2006-317185 | | 11/2006 |
| JP | 2008-058234 | | 3/2008 |
| JP | 2008-123215 | | 5/2008 |
| JP | 2008-149860 | * | 7/2008 |
| JP | 2009-086788 | | 4/2009 |
| WO | WO 2008/062512 | | 5/2008 |

* cited by examiner

VEHICLE SURROUNDING MONITOR DEVICE AND METHOD FOR MONITORING SURROUNDINGS USED FOR VEHICLE

CROSS-REFERENCE TO RELATED APPLICATIONS

This application is a national phase application of International Application No. PCT/JP2009/060278, filed Jun. 4, 2009, the contents of which are incorporated herein by reference.

TECHNICAL FIELD

The present invention relates to a vehicle surrounding monitor device and a method for monitoring surroundings used for a vehicle. In particular, the present invention relates to a vehicle surrounding monitor device which uses a plurality of monitoring sensors for monitoring different areas around a vehicle, and to a method for monitoring surroundings used for a vehicle.

BACKGROUND ART

In order to improve the safety or convenience of automobiles, systems, such as a pre-crash safety system (PCS) and a radar cruise control system (RCC), have been developed or put into production. Various systems, such as a system which performs control such that a host vehicle autonomously travels on a road to a destination while automatically avoiding obstacles and a system which provides a driver with notification of the approach of obstacles or the obstacle avoidance directions, have been suggested. For this reason, a technique which enables the recognition of information relating to obstacles, such as other vehicles which are traveling around the host vehicle, with satisfactory precision has become important.

For example, Patent Literature 1 describes a device which monitors the head portion or eye line of a driver of a vehicle, directs a sensor head portion to the line of sight of the driver, and detects vehicles, obstacles, and the like in a direction to which the driver pays attention, making it possible to cope with an unexpected event.

CITATION LIST

Patent Literature

[Patent Literature 1] Japanese Unexamined Patent Application Publication No. 2001-126195

SUMMARY OF INVENTION

Technical Problem

However, according to the above-described technique, it is difficult to detect obstacles, such as other vehicles, which approach from a direction opposite to the direction in which the sensor head portion is directed. Accordingly, if the surroundings of the host vehicle are monitored using a plurality of cameras or sensors, such as radar, which are directed in different directions, the processing load of a CPU (Central Control Unit) increases due to an increase in the number of sensors, or the load of an in-vehicle LAN (Local Area Network) increase due to an increase in the amount of data. The increase in the load of the CPU or the in-vehicle LAN leads to trouble in appropriately performing an obstacle detection process or driving support based on the obstacle detection process.

The invention has been finalized in consideration of the above-described situation, and an object of the invention is to provide a vehicle surrounding monitor device and a method for monitoring surroundings used for a vehicle capable of monitoring the surroundings of a host vehicle using a plurality of monitoring sensors for monitoring different areas around the host vehicle while reducing the load of a CPU or an in-vehicle LAN.

Solution to Problem

The invention provides a vehicle surrounding monitor device. The vehicle surrounding monitor device includes a plurality of monitoring sensors which monitor different areas around a host vehicle, a state detection unit which detects one of the traveling state of the host vehicle and the state of a driver of the host vehicle, and a control unit which controls one of the operation of the monitoring sensors and the processing of information output from the monitoring sensors. The control unit sets priority on a plurality of monitoring sensors on the basis of one of the traveling state of the host vehicle and the state of the driver of the host vehicle detected by the state detection unit, and controls one of the operation of the monitoring sensors and the processing of information output from the monitoring sensors on the basis of the priority.

With this configuration, the vehicle surrounding monitor device includes a plurality of monitoring sensors which monitor different areas around the host vehicle, the state detection unit which detects one of the traveling state of the host vehicle and the state of the driver of the host vehicle, and the control unit which controls one of the operation of the monitoring sensors and the processing of information output from the monitoring sensors. In this vehicle surrounding monitor device, the control unit sets priority on a plurality of monitoring sensors on the basis of one of the traveling state of the host vehicle and the state of the driver of the host vehicle detected by the state detection unit, and controls one of the operation of the monitoring sensors and the processing of information output from the monitoring sensors on the basis of the priority. For this reason, control differs between a monitoring sensor having high priority and a monitoring sensor having low priority. Therefore, even when a plurality of monitoring sensors are used, it becomes possible to monitor the surroundings of the host vehicle while reducing the load of the CPU or the in-vehicle LAN.

In this case, the control unit may set higher priority on a monitoring sensor which monitors an area near the traveling direction of the host vehicle than a monitoring sensor which monitors an area apart from the traveling direction of the host vehicle on the basis of one of the traveling state of the host vehicle and the state of the driver of the host vehicle detected by the state detection unit.

With this configuration, the control unit sets higher priority on a monitoring sensor which monitors an important area near the traveling direction of the host vehicle than a monitoring sensor which monitors a less important area apart from the traveling direction of the host vehicle on the basis of one of the traveling state of the host vehicle and the state of the driver of the host vehicle detected by the state detection unit. Therefore, it is possible to appropriately set priority in accordance with the importance of the monitoring sensors.

The state detection unit may detect the line of sight of the driver of the host vehicle, and the control unit may set higher priority on a monitoring sensor which monitors an area not included in the line of sight of the driver of the host vehicle than a monitoring sensor which monitors an area not included in the line of sight of the driver of the host vehicle on the basis of the line of sight of the driver of the host vehicle detected by the state detection unit.

With this configuration, the state detection unit detects the line of sight of the driver of the host vehicle, and the control unit sets higher priority on a monitoring sensor, which monitors an area not included in the line of sight of the driver of the host vehicle and having a great need for monitoring, than a monitoring sensor, which monitors an area included in the line of sight of the driver of the host vehicle and having a less need for monitoring, on the basis of the line of sight of the driver of the host vehicle detected by the state detection unit. Therefore, it is possible to appropriately set priority in accordance with the need for monitoring.

In this case, the vehicle surrounding monitor device may further include a warning notification unit which provides notification of a warning for an obstacle detected by the monitoring sensors to the driver of the host vehicle. The control unit may perform control such that the warning notification unit preferentially provides notification of a warning for an obstacle detected by a monitoring sensor, which monitors an area not included in the line of sight of the driver of the host vehicle, over a warning for an obstacle detected by a monitoring sensor, which monitors an area included in the line of sight of the driver of the host vehicle, on the basis of the line of sight of the driver of the host vehicle detected by the state detection unit.

With this configuration, the vehicle surrounding monitor device further includes the warning notification unit which provides notification of a warning for an obstacle detected by the monitoring sensors to the driver of the host vehicle. The control unit performs control such that the warning notification unit preferentially provides notification of a warning for an obstacle detected by a monitoring sensor, which monitors an area not included in the line of sight of the driver of the host vehicle and having a great need for warning notification, over a warning for an obstacle detected by a monitoring sensor, which monitors an area included in the line of sight of the driver of the host vehicle and having a less need for warning notification, on the basis of the line of sight of the driver of the host vehicle detected by the state detection unit. Therefore, it is possible to appropriately provide notification of a warning in accordance with the need for warning notification while reducing the load of the CPU or the in-vehicle LAN.

The control unit may change detection precision to be high for a monitoring sensor having high priority.

With this configuration, the control unit changes detection precision to be high for a monitoring sensor having high priority. For this reason, a monitoring sensor having high priority performs monitoring with necessary high detection precision, and a monitoring sensor having low priority performs monitoring with low detection precision placing a light load on the CPU or the in-vehicle LAN. Therefore, even when a plurality of monitoring sensors are used, it becomes possible to monitor the surroundings of the host vehicle while reducing the load of the CPU or the in-vehicle LAN.

For a monitoring sensor having high priority, the control unit may shorten the period of processing information output from the monitoring sensor.

With this configuration, for a monitoring sensor having high priority, the control unit shortens the period of processing information output from the monitoring sensor. For this reason, information from a monitoring sensor having high priority is processed frequently in a necessary short period, and information from a monitoring sensor having low priority is processed in a low and long period placing a light load on the CPU or the in-vehicle LAN. Therefore, even when a plurality of monitoring sensors are used, it becomes possible to monitor the surroundings of the host vehicle while reducing the load of the CPU or the in-vehicle LAN.

The state detection unit may detect one of a lane in which the host vehicle is currently traveling and a lane in which the host vehicle will be traveling, and the control unit may set higher priority on a monitoring sensor, which monitors an area near one of the lane, in which the host vehicle is currently traveling, and the lane, in which the host vehicle will be traveling, detected by the state detection unit, than a monitoring sensor, which monitors an area apart from one of the lane, in which the host vehicle is currently traveling, and the lane, in which the host vehicle will be traveling, detected by the state detection unit.

With this configuration, the state detection unit detects one of the lanes in which the host vehicle is currently traveling and the line in which the host vehicle will be traveling, and the control unit sets higher priority on a monitoring sensor, which monitors an important area near one of the lane, in which the host vehicle is currently traveling, and the lane, in which the host vehicle will be traveling, detected by the state detection unit, than a monitoring sensor, which monitors a less important area apart from one of the lane, in which the host vehicle is currently traveling, and the lane, in which the host vehicle will be traveling, detected by the state detection unit. Therefore, even when a plurality of monitoring sensors are used, it becomes possible to monitor the surroundings of the host vehicle while reducing the load of the CPU or the in-vehicle LAN.

The invention provides a method for monitoring surroundings used for a vehicle. The method includes the steps of causing a plurality of monitoring sensors to monitor different areas around a host vehicle, causing a state detection unit to detect one of the traveling state of the host vehicle and the state of a driver of the host vehicle, causing a control unit to set priority on a plurality of monitoring sensor on the basis of one of the traveling state of the host vehicle and the state of the driver of the host vehicle detected by the state detection unit, and causing the control unit to control one of the operation of the monitoring sensors and the processing of information output from the monitoring sensors on the basis of the set priority.

In this case, in the step of causing the control unit to set priority on a plurality of monitoring sensors, the control unit may set higher priority on a monitoring sensor which monitors an area near the traveling direction of the host vehicle than a monitoring sensor which monitors an area apart from the traveling direction of the host vehicle on the basis of one of the traveling state of the host vehicle and the state of the driver of the host vehicle detected by the state detection unit.

In the step of causing the state detection unit to detect one of the traveling state of the host vehicle and the state of the driver of the host vehicle, the state detection unit may detect the line of sight of the driver of the host vehicle, and in the step of causing the control unit to set priority on a plurality of monitoring sensors, the control unit may set higher priority on a monitoring sensor, which monitors an area not included in the line of sight of the driver of the host vehicle, than a monitoring sensor, which monitors an area included in the line of sight of the driver of the host vehicle, on the basis of the line of sight of the driver of the host vehicle detected by the state detection unit.

In this case, the method may further include the step of causing a warning notification unit to provide notification of a warning for an obstacle detected by the monitoring sensors to the driver of the host vehicle. In the step of causing the warning notification unit to provide notification of a warning, the control unit may perform control such that the warning notification unit preferentially provides notification of a warning for an obstacle detected by a monitoring sensor, which monitors an area not included in the line of sight of the driver of the host vehicle, over a warning for an obstacle detected by a monitoring sensor, which monitors an area included in the line of sight of the driver of the host vehicle, on the basis of the line of sight of the driver of the host vehicle detected by the state detection unit.

In the step of causing the control unit to control one of the operation of the monitoring sensors and the processing of information output from the monitoring sensors on the basis of the set priority, the control unit may change detection precision to be high for a monitoring sensor having high priority.

In the step of causing the control unit to control one of the operation of the monitoring sensors and the processing of information output from the monitoring sensors on the basis of the set priority, for a monitoring sensor having high priority, the control unit may shorten the period of processing information output from the monitoring sensor.

In the step of causing the state detection unit to detect one of the traveling state of the host vehicle and the state of the driver of the host vehicle, the state detection unit may detect one of a lane in which the host vehicle is currently traveling and a lane in which the host vehicle will be traveling, and in the step of causing the control unit to set priority on a plurality of monitoring sensors, the control unit may set higher priority on a monitoring sensor, which monitors an area near one of the lane, in which the host vehicle is currently traveling, and the lane, in which the host vehicle will be traveling, detected by the state detection unit, than a monitoring sensor, which monitors an area apart from one of the lane, in which the host vehicle is currently traveling, and the lane, in which the host vehicle will be traveling, detected by the state detection unit.

Advantageous Effects of Invention

According to the vehicle surrounding monitor device and the method for monitoring surroundings used for a vehicle of the invention, it becomes possible to monitor the surroundings of the host vehicle using a plurality of monitoring sensors for monitoring different areas around the host vehicle while reducing the load of the CPU or the in-vehicle LAN.

DESCRIPTION OF EMBODIMENTS

Hereinafter, a vehicle surrounding monitor device and a method for monitoring surroundings used for a vehicle according to an embodiment of the invention will be described with reference to the drawings.

In a first embodiment of the invention, the vehicle surrounding monitor device of a vehicle according to the invention is applied to a radar cruise control system. The radar cruise control system is also called an ACC (Adaptive Cruise Control) system, and performs ACC control such that a host vehicle is traveling in accordance with one of a set vehicle speed and a set inter-vehicle distance (inter-vehicle time) from a preceding vehicle, thereby supporting the driving operation of a driver.

Figure 1:
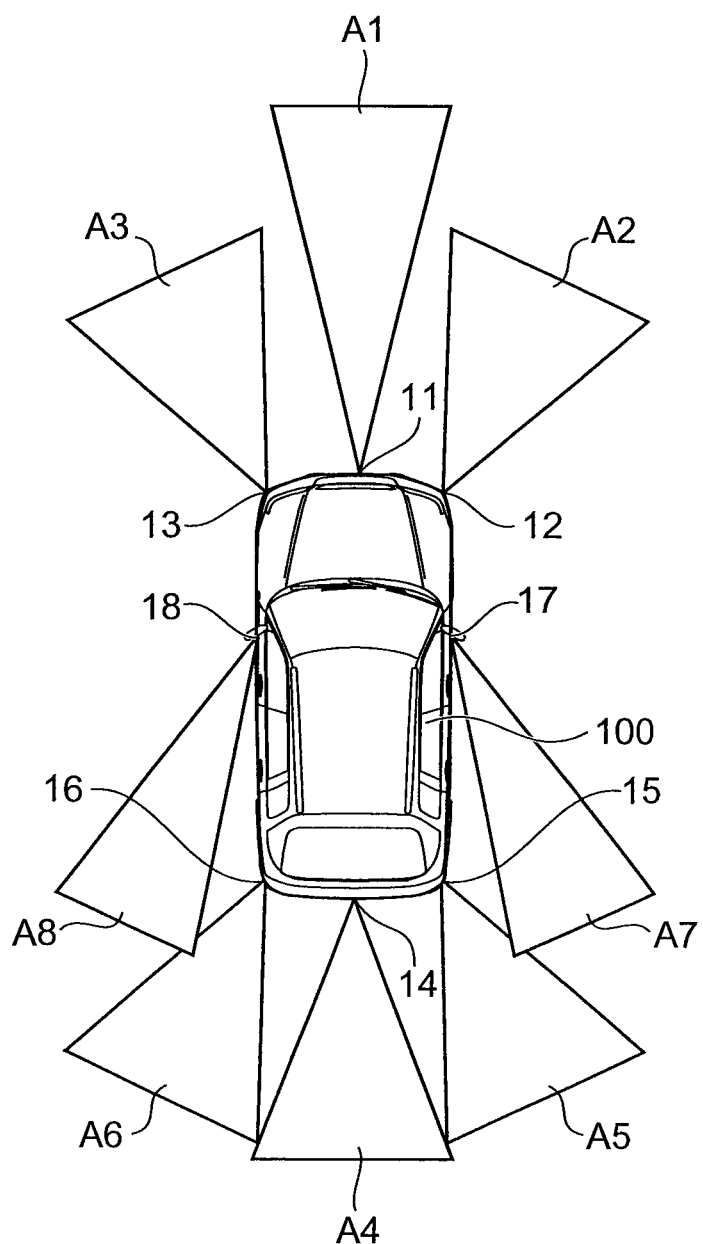
FIG. 1 is a plan view showing the monitoring range of each radar of a vehicle in which a radar cruise control system according to a first embodiment is mounted.
Figure 2:
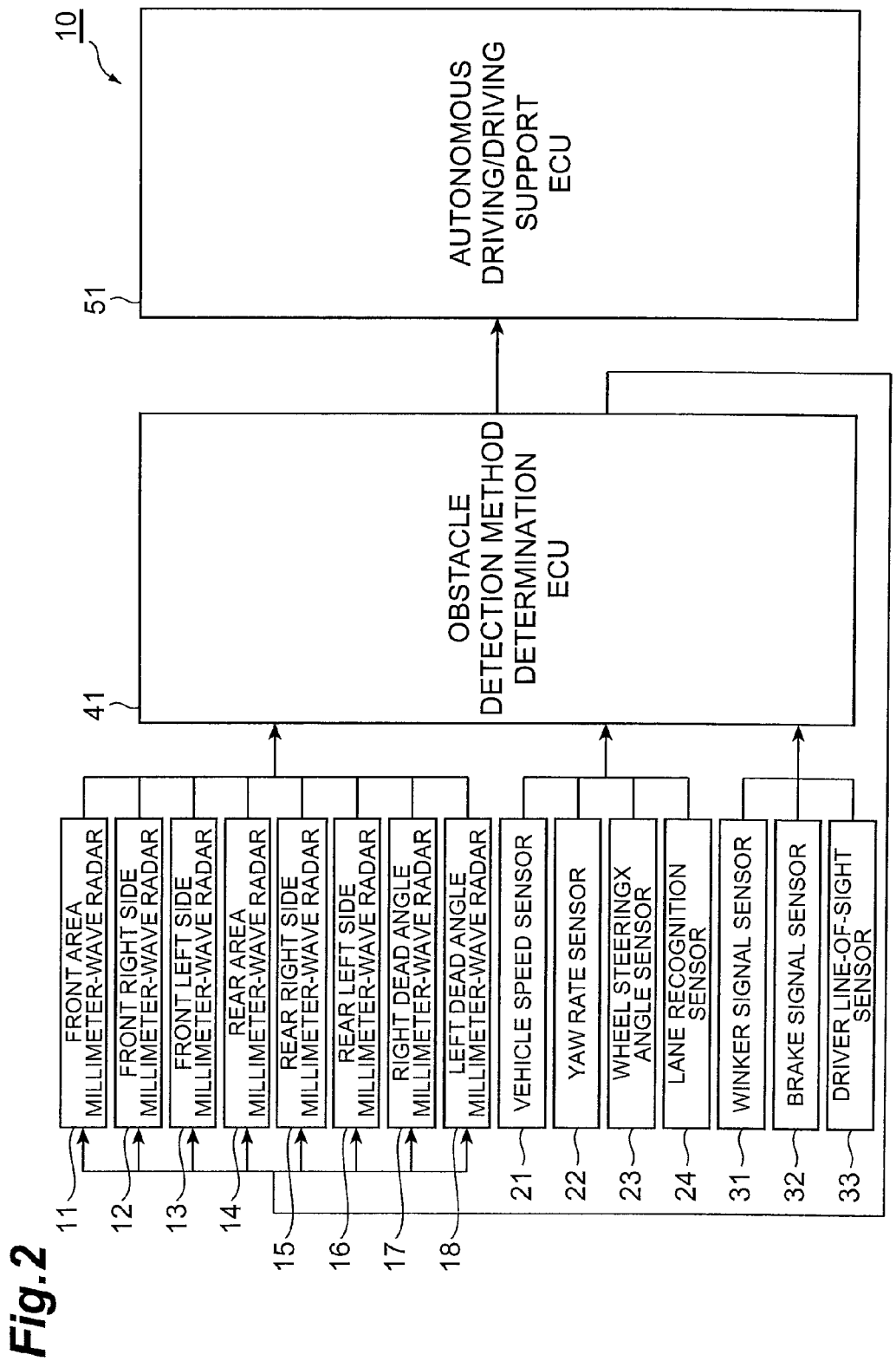
FIG. 2 is a block diagram showing the configuration of the radar cruise control system according to the first embodiment.

As shown in FIGS. 1 and 2, in this embodiment, a host vehicle 100 and a radar cruise control system 10 which is mounted in the host vehicle 100 include a front area millimeter-wave radar 11, a front right side millimeter-wave radar 12, a front left side millimeter-wave radar 13, a rear area millimeter-wave radar 14, a rear right side millimeter-wave radar 15, a rear left side millimeter-wave radar 16, a right dead angle millimeter-wave radar 17, and a left dead angle millimeter-wave radar 18 which are used to monitor different monitoring areas A1 to A8.

The radars including the front area millimeter-wave radar 11 and the like are used to detect obstacles around the host vehicle 100. A millimeter-wave radar is a sensor which irradiates an electromagnetic wave, such as a millimeter wave, on a monitoring area, receives a reflected wave reflected by an object, and detects the speed, acceleration, distance, inter-vehicle time, and the like of an obstacle, such as another vehicle. Instead of a millimeter-wave radar, an image sensor, such as a camera, a laser radar, or the like may be applied.

As shown in FIG. 2, the radar cruise control system 10 includes a vehicle speed sensor 21, a yaw rate sensor 22, a wheel steering angle sensor 23, and a lane recognition sensor 24 which are used to detect the motion of the host vehicle 100. The lane recognition sensor 24 is used to recognize line markings (hereinafter, abbreviated as white lines) on a road, and to detect the traveling position of the host vehicle 100 in a lane. Specifically, the lane recognition sensor 24 is an image sensor, such as a camera. Meanwhile, for the lane recognition sensor 24, a laser radar or the like may be applied.

The radar cruise control system 10 includes a winker signal sensor 24, a brake signal sensor 25, and a driver line-of-sight sensor 26 which are used to detect the intention of the behavior of the driver. The winker signal sensor 24 and the brake signal sensor 25 are respectively used to detect the states of a winker operation and a brake operation by the driver. Specifically, the driver line-of-sight sensor 25 is a sensor which performs pattern recognition on the image of the head portion of the driver captured by a camera or the like, and detects the movement of the eye and the method of sight of the driver. As a device which is used to detect the intention of the behavior of the driver, the wheel steering angle sensor 23 is also appropriately used.

The radar cruise control system 10 includes an obstacle detection method determination ECU (Electronic Control Unit) 41. The obstacle detection method determination ECU 41 sets priority on the front area millimeter-wave radar 11 to the left dead angle millimeter-wave radar 18 on the basis of information acquired by the front area millimeter-wave radar 11, and various sensors including the vehicle speed sensor 21, the winker signal sensor 31, and the like. The obstacle detection method determination ECU 41 is used to control one of the operation of the front area millimeter-wave radar 11 to the left dead angle millimeter-wave radar 18 and the processing of information output from the front area millimeter-wave radar 11 to the left dead angle millimeter-wave radar 18 on the basis of the set priority. For this reason, a command signal from the obstacle detection method determination ECU 41 is fed back to the front area millimeter-wave radar 11 to the left dead angle millimeter-wave radar 18.

An autonomous driving/driving support ECU 51 is used to perform, on the basis of information relating to obstacles around the host vehicle 100 output from the obstacle detection method determination ECU 41, autonomous driving such that the host vehicle autonomously travels on a road to a destination while automatically avoiding the obstacles, or driving support to provide the driver with notification of the approach of obstacles or the obstacle avoidance directions. The devices are connected to each other by an in-vehicle LAN or the like.

Hereinafter, the operation of the radar cruise control system 10 of this embodiment will be described. The following steps are repeatedly performed for 10 milliseconds to 1 second during traveling of the host vehicle 100. The obstacle detection method determination ECU 41 resets the priority flags of the front area millimeter-wave radar 11 to the left dead angle millimeter-wave radar 18 to the initial values (S101).

The obstacle detection method determination ECU 41 detects the traveling direction or predicted traveling direction of the host vehicle 100 or the lane, in which the host vehicle 100 is currently traveling, and the lane, in which the host vehicle 100 will be traveling, from the motion of the host vehicle 100 detected by the vehicle speed sensor 21, the yaw rate sensor 22, the wheel steering angle sensor 23, and the lane recognition sensor 24, or the behavior of the driver of the host vehicle 100 detected by the winker signal sensor 24, the brake signal sensor 25, and the driver line-of-sight sensor 26 (S102).

When the determination result on whether the traveling direction is left or right is the straight direction, the obstacle detection method determination ECU 41 increments +1 in the priority flags of the front area millimeter-wave radar 11 and the rear area millimeter-wave radar 14 (S103, S104). When the determination result on whether the traveling direction is left or right is the right direction, the obstacle detection method determination ECU 41 increments +1 in the priority flags of the front right side millimeter-wave radar 12, the rear right side millimeter-wave radar 15, and the right dead angle millimeter-wave radar 17 (S103, S105). When the determination result on whether the traveling direction is left or right is the left direction, the obstacle detection method determination ECU 41 increments +1 in the priority flags of the front left side millimeter-wave radar 13, the rear left side millimeter-wave radar 16, and the left dead angle millimeter-wave radar 18 (S103, S106).

When the determination result on whether the traveling direction is front or rear is acceleration, the obstacle detection method determination ECU 41 increments +1 in the priority flags of the front area millimeter-wave radar 11, the front right side millimeter-wave radar 12, and the front left side millimeter-wave radar 13 (S107, S108). When the determination result on whether the traveling direction is front or rear is deceleration, the obstacle detection method determination ECU 41 increments +1 in the priority flags of the rear area millimeter-wave radar 14, the right side millimeter-wave radar 15, and the left side millimeter-wave radar 16 (S107, S109).

The obstacle detection method determination ECU 41 rearranges the front area millimeter-wave radar 11 to the left dead angle millimeter-wave radar 18 in a decreasing order of the priority flag (S110).

Figure 3:
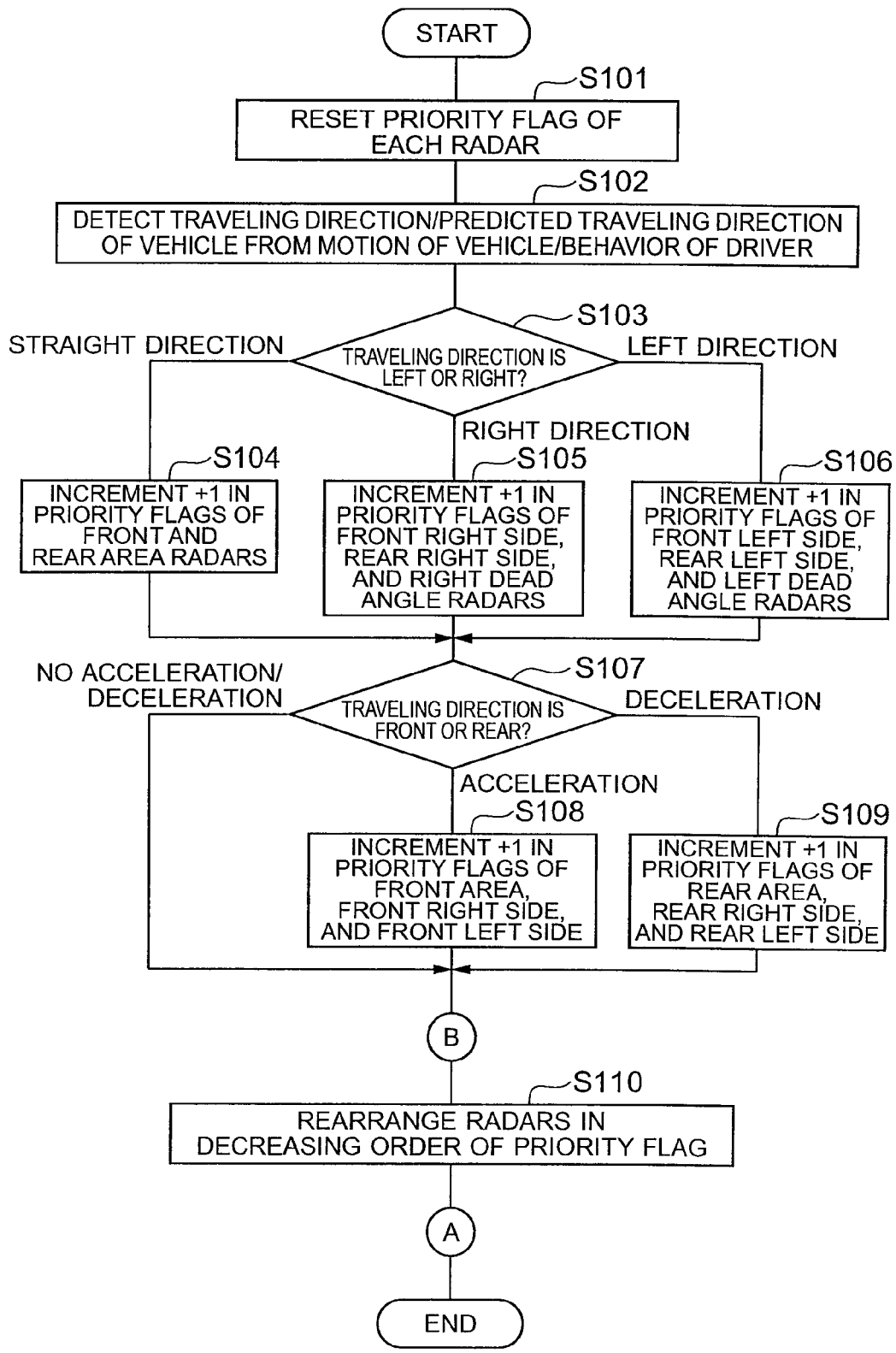
FIG. 3 is a flowchart showing an operation to set priority of each radar.

The obstacle detection method determination ECU 41 preferentially performs an information process in order from a radar having a large priority flag after S110 of FIG. 3, and also controls the front area millimeter-wave radar 11 to the left dead angle millimeter-wave radar 18 by the following method in a connector A of FIG. 3.

Figure 4:
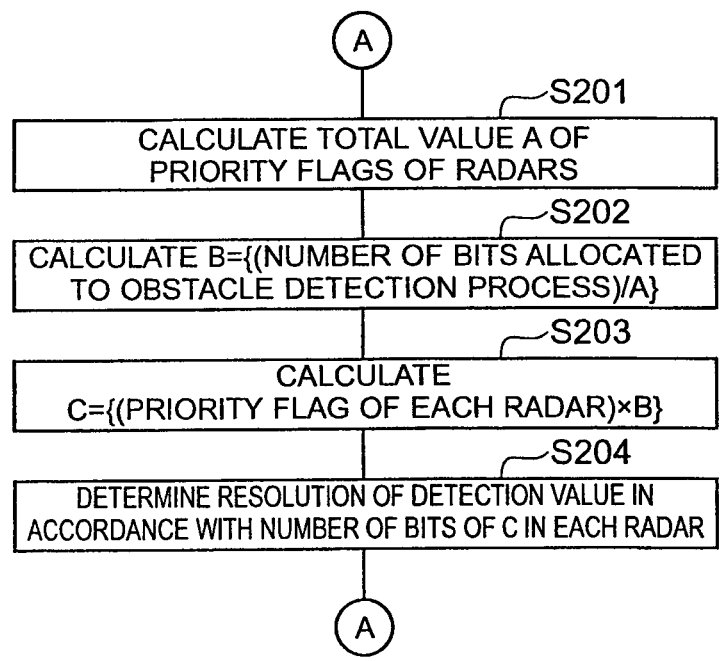
FIG. 4 is a flowchart showing an operation to set the resolution of a detection value of each radar in accordance with the priority of each radar in a connector A of FIG. 3.

As shown in FIG. 4, the obstacle detection method determination ECU 41 calculates the total value A of the priority flags of the radars (S201). For example, when it is assumed that the host vehicle 100 includes only three radars of the front area millimeter-wave radar 11, the front right side millimeter-wave radar 12, and the front left side millimeter-wave radar 13, if the priority flag of the front area millimeter-wave radar 11 is 3, the priority flag of the front right side millimeter-wave radar 12 is 2, and the priority flag of the front left side millimeter-wave radar 13 is 1, the total value A of the priority flags becomes A=3+2+1=6.

The obstacle detection method determination ECU 41 calculates B={(the number of bits allocated to the obstacle detection process/A} (S202). For example, if the number of bits allocated to the obstacle detection process is 24 bits per unit time, in the above-described example, since A=6, B=24/6=4.

The obstacle detection method determination ECU 41 calculates C={(the priority flag of each radar)×B} (S203). In the above-described example, C of the front area millimeter-wave radar 11 becomes C=3×4=12, C of the front left side millimeter-wave radar 12 becomes C=2×4=8, and C of the front area millimeter-wave radar 13 becomes C=1×4=4.

The obstacle detection method determination ECU 41 determines the resolution of the detection value in accordance with the number of bits of C in each radar (S204). In this case, the obstacle detection method determination ECU 41 sends a control signal to each radar including the front area millimeter-wave radar 11 and the like, and increases or decreases the detection precision of each radar in accordance with the number of bits of C such that the larger C, the higher the detection precision of the radar. The obstacle detection method determination ECU 41 increases or decreases the period of processing information output from each radar including the front area millimeter-wave radar 11 and the like in accordance with the number of bits of C such that the larger C, the shorter the period of processing information.

According to this embodiment, the vehicle surrounding monitor device 10 includes a plurality of front area millimeter-wave radar 11 to left dead angle millimeter-wave radar 18 which monitor different areas around the host vehicle 100, the vehicle speed sensor 21, the yaw rate sensor 22, the wheel steering angle sensor 23, and the lane recognition sensor 24 which detect the traveling state of the host vehicle 100, the winker signal sensor 31, the brake signal sensor 32, and the driver line-of-sight sensor 33 which detect the state of the driver of the host vehicle 100, and the obstacle detection method determination ECU 41 which controls one of the operation of the front area millimeter-wave radar 11 to the left dead angle millimeter-wave radar 18 and the processing of information output from the front area millimeter-wave radar 11 to the left dead angle millimeter-wave radar 18. The obstacle detection method determination ECU 41 sets priority on a plurality of front area millimeter-wave radar 11 to left dead angle millimeter-wave radar 18 on the basis of the traveling state of the host vehicle 100 and the state of the driver of the host vehicle 100 detected by the vehicle speed sensor 21, the winker signal sensor 31, and the like, and controls one of the operation of the front area millimeter-wave radar 11 to the left dead angle millimeter-wave radar 18 and the processing of information output from the front area millimeter-wave radar 11 to the left dead angle millimeter-wave radar 18. Therefore, control differs between a radar having high priority and a radar having low priority, such that, even when a plurality of radars are used, it becomes possible to monitor the surroundings of the host vehicle 100 while reducing the load of the CPU or the in-vehicle LAN.

In this embodiment, the obstacle detection method determination ECU 41 sets higher priority on a radar, which monitors an important area near the traveling direction of the host vehicle 100, than a radar, which monitors a less important area apart from the traveling direction of the host vehicle 100, on the basis of the traveling state of the host vehicle 100 and the state of the driver of the host vehicle detected by the vehicle speed sensor 21, the winker signal sensor 31, and the like, thereby appropriately setting the priority in accordance with the importance of the radar.

In this embodiment, the obstacle detection method determination ECU 41 changes detection precision to be high for a radar having high priority. For this reason, a read having high priority performs monitoring with necessary high detection precision, and a radar having low priority performs monitoring with low detection precision placing a light load on the CPU or the in-vehicle LAN. Therefore, even when a plurality of radars are used, it becomes possible to monitor the surroundings of the host vehicle 100 while reducing the load of the CPU or the in-vehicle LAN.

In this embodiment, for a radar having high priority, the obstacle detection method determination ECU 41 shortens the period of processing information output from the radar. For this reason, information from a radar having high priority is processed frequently in a necessary short period, and information from a radar having low priority is processed in a low and long period placing a light load on the CPU or the in-vehicle LAN. Therefore, even when a plurality of radars are used, it becomes possible to monitor the surroundings of the host vehicle 100 while reducing the load of the CPU or the in-vehicle LAN.

In this embodiment, the lane recognition sensor 24 detects one of the lane in which the host vehicle 100 is currently traveling and the lane in which the host vehicle 100 will be traveling, and the obstacle detection method determination ECU 41 sets higher priority on a radar, which monitors an important area near the lane, in which the host vehicle 100 is currently traveling, and the lane, in which the host vehicle 100 will be traveling, detected by the lane recognition sensor 24, than a radar, which monitors a less important area apart from the lane, in which the host vehicle 100 is currently traveling, and the lane, in which the host vehicle 100 will be traveling, detected by the lane recognition sensor 24. Therefore, even when a plurality of radars are used, it becomes possible to monitor the surroundings of the host vehicle 100 while reducing the load of the CPU or the in-vehicle LAN.

Figure 5:
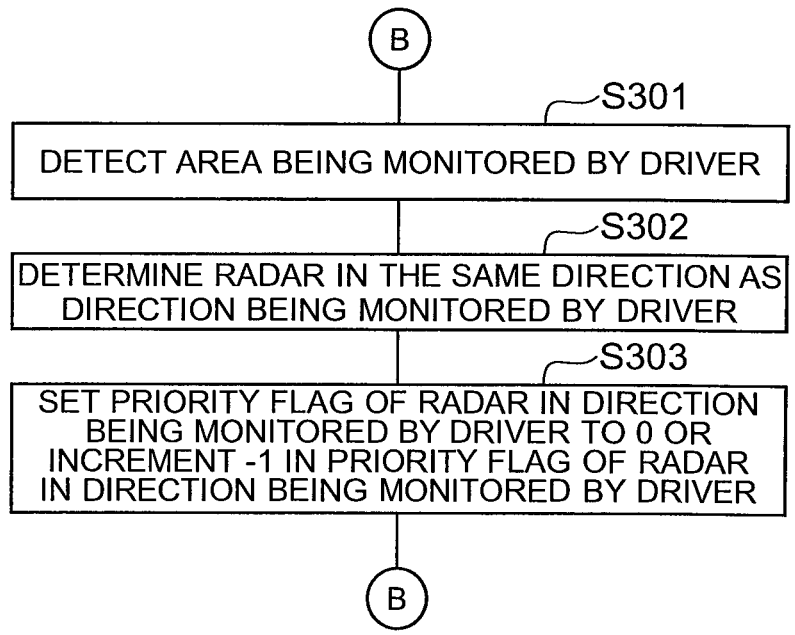
FIG. 5 is a flowchart showing an operation to set priority of each radar in accordance with an area being monitored by a driver in a connector B of FIG. 3.

Hereinafter, a second embodiment of the invention will be described. In this embodiment, the following process is performed in a connector B of FIG. 3. As shown in FIG. 5, the obstacle detection method determination ECU 41 detects an area being monitored by the driver of the host vehicle 100 by the driver line-of-sight sensor 33 (S301).

The obstacle detection method determination ECU 41 determines a radar in the same direction as the direction being monitored by the driver from among the front area millimeter-wave radar 11 to the left dead angle millimeter-wave radar 18 (S302). A radar in the same direction as the direction being monitored by the driver can be regarded as a radar which monitors an area included in the line of sight of the driver.

The obstacle detection method determination ECU 41 sets the priority flag of a radar in the direction being monitored by the driver from among the front area millimeter-wave radar 11 to the left dead angle millimeter-wave radar 18 to zero or decrements −1 in the priority flag of a radar in the direction being monitored by the driver (S303). The obstacle detection method determination ECU 41 and the autonomous driving/driving support ECU 51 perform the same process as in the first embodiment on the basis of the set priority flags.

The obstacle detection method determination ECU 41 performs control such that the autonomous driving/driving support ECU 51 preferentially provides notification of a warning for an obstacle detected by a radar, which has a large priority flag and monitors an area not included in the line of sight of the driver of the host vehicle 100, over a warning for an obstacle detected by a radar, which has a small priority flag and monitors an area included in the line of sight of the driver of the host vehicle 100, on the basis of the set priority. Specifically, a warning provides the driver with notification of the approach of obstacles or the obstacle avoidance directions by image display on a display or sound from a speaker or a buzzer.

In this embodiment, the driver line-of-sight sensor 33 detects the line of sight of the driver of the host vehicle 100, and the obstacle detection method determination ECU 41 set higher priority on a radar, which monitors an area not included in the line of sight of the driver of the host vehicle 100 and having a great need for monitoring, than a radar, which monitors an area included in the line of sight of the driver of the host vehicle 100 and having a less need for monitoring, on the basis of the line of sight of the driver of the host vehicle 100 detected by the driver line-of-sight sensor 33. Therefore, it is possible to appropriately set the priority in accordance with the need for monitoring.

In this embodiment, the obstacle detection method determination ECU 41 performs control such that the autonomous driving/driving support ECU 51 preferentially provides notification of a warning for an obstacle detected by a radar, which monitors an area not included in the line of sight of the driver of the host vehicle 100 and having a great need for warning notification, over a warning for an obstacle detected by a radar, which monitors an area included in the line of sight of the driver of the host vehicle 100 and having a less need for warning notification, on the basis of the line of sight of the driver of the host vehicle 100 detected by the driver line-of-sight sensor 33. Therefore, it is possible to appropriately provide notification of a warning in accordance with the need for warning notification while reducing the load of the CPU or the in-vehicle LAN.

Although the embodiments of the invention have been described, the invention is not limited to the foregoing embodiments, and various modifications may be made.

INDUSTRIAL APPLICABILITY

The invention can provide a vehicle surrounding monitor device and a method for monitoring surroundings used for a vehicle capable of monitoring the surroundings of a host vehicle using a plurality of monitoring sensors for monitoring different areas around the host vehicle while reducing the load of a CPU or an in-vehicle LAN.

REFERENCE SIGNS LIST

10: radar cruise control system
11: front area millimeter-wave radar
12: front right side millimeter-wave radar
13: front left side millimeter-wave radar
14: rear area millimeter-wave radar
15: rear right side millimeter-wave radar
16: rear left side millimeter-wave radar 17: right dead angle millimeter-wave radar
18: left dead angle millimeter-wave radar
21: vehicle speed sensor
22: yaw rate sensor
23: wheel steering angle sensor
24: lane recognition sensor
31: winker signal sensor
32: brake signal sensor
33: driver line-of-sight sensor
41: obstacle detection direction determination ECU
51: autonomous driving/driving support ECU

The invention claimed is:

1. A vehicle surrounding monitor device comprising:
a plurality of monitoring sensors which monitor different areas around a host vehicle;
a state detection unit which detects one of the traveling state of the host vehicle and the state of a driver of the host vehicle; and
a control unit which controls one of the operation of the monitoring sensors and processing of information output from the monitoring sensors,
wherein the control unit sets priority on a plurality of monitoring sensors on the basis of one of the traveling state of the host vehicle and the state of the driver of the host vehicle detected by the state detection unit, distributes the amount of information per unit time to be allocated to the processing of information output from each of the monitoring sensors from the amount of information per unit time allocated to the whole of the processing of information output from the monitoring sensors on the basis of the set priority, and controls one of the detection precision of each of the monitoring sensors and the period of processing information output from each of the monitoring sensors in accordance with the distributed amount of information per unit time to be allocated to the processing of information output from each of the monitoring sensors,
wherein the state detection unit detects the line of ht of the driver of the host vehicle, and
wherein the control unit sets higher priority on a monitoring sensor, which monitors an area not included in the line of sight of the driver of the host vehicle, than a monitoring sensor, which monitors an area included in the line of sight of the driver of the host vehicle, on the basis of the line sight of the driver of the host vehicle detected by the state detection unit.

2. The vehicle surrounding monitor device according to claim 1,
wherein the control unit sets higher priority on a monitoring sensor which monitors an area near the traveling direction of the host vehicle than a monitoring sensor which monitors an area apart from the traveling direction of the host vehicle on the basis of one of the traveling state of the host vehicle and the state of the driver of the host vehicle detected by the state detection unit.

3. The vehicle surrounding monitor device according to claim 1, further comprising:
a warning notification unit which provides notification of a warning for an obstacle detected by the monitoring sensors to the driver of the host vehicle,
wherein the control unit performs control such that the warning notification unit preferentially provides notification of a warning for an obstacle detected by a monitoring sensor, which monitors an area not included in the line of sight of the driver of the host vehicle, over a warning for an obstacle detected by a monitoring sensor, which monitors an area included in the line of sight of the driver of the host vehicle, on the basis of the line of sight of the driver of the host vehicle detected by the state detection unit.

4. The vehicle surrounding monitor device according to claim 1,
wherein the control unit changes detection precision to be high for a monitoring sensor having high priority.

5. The vehicle surrounding monitor device according to claim 1,
wherein, for a monitoring sensor having high priority, the control unit shortens the period of processing information output from the monitoring sensor.

6. The vehicle surrounding monitor device according to claim 1,
wherein the state detection unit detects one of a lane in which the host vehicle is currently traveling and a lane in which the host vehicle will be traveling,
the control unit sets higher priority on a monitoring sensor, which monitors an area near one of the lane, in which the host vehicle is currently traveling, and the lane, in which the host vehicle will be traveling, detected by the state detection unit, than a monitoring sensor, which monitors an area apart from one of the lane, in which the host vehicle is currently traveling, and the lane, in which the host vehicle will be traveling, detected by the state detection unit.

7. A method for monitoring surroundings used for a vehicle, the method comprising the steps of:
causing a plurality of monitoring sensors to monitor different areas around a host vehicle;
causing a state detection unit to detect one of the traveling state of the host vehicle and the state of a driver of the host vehicle;
causing a control unit to set priority on a plurality of monitoring sensors on the basis of one of the traveling state of the host vehicle and the state of the driver of the host vehicle detected by the state detection unit;
causing the control unit to distribute the amount of information per unit time to be allocated to the processing of information output from each of the monitoring sensors from the amount of information per unit time allocated to the whole of the processing of information output from the monitoring sensors on the basis of the set priority; and
causing the control unit to control one of the detection precision of each of the monitoring sensors and the period of processing information output from each of the monitoring sensors in accordance with the distributed amount of information per unit time to be allocated to the processing of information output from each of the monitoring sensors,
wherein, in the step of causing the state detection unit to detect one of the traveling state of the host vehicle and the state of the driver of the host vehicle, the state detecting unit detects the line of sight of the driver of the host vehicle, and
in the step of causing the control unit to set priority on a plurality of monitoring sensors, the control unit sets higher priority on a monitoring sensor, which monitors an area not included in the line of sight of the driver of the host vehicle, than a monitoring sensor, which monitors an area included in the line of sight of the driver of the host vehicle, on the basis of the line of sight of the driver of the host vehicle detected by the state detection unit.

8. The method according to claim 7,
wherein, in the step of causing the control unit to set priority on a plurality of monitoring sensors, the control unit sets higher priority on a monitoring sensor which monitors an area near the traveling direction of the host vehicle than a monitoring sensor which monitors an area apart from the traveling direction of the host vehicle on the basis of one of the traveling state of the host vehicle and the state of the driver of the host vehicle detected by the state detection unit.

9. The method according to claim 7, further comprising the step of:
causing a warning notification unit to provide notification of a warning for an obstacle detected by the monitoring sensors to the driver of the host vehicle,
wherein, in the step of causing the warning notification unit to provide notification of a warning, the control unit performs control such that the warning notification unit preferentially provides notification of a warning for an obstacle detected by a monitoring sensor, which monitors an area not included in the line of sight of the driver of the host vehicle, over a warning for an obstacle detected by a monitoring sensor, which monitors an area included in the line of sight of the driver of the host vehicle, on the basis of the line of sight of the driver of the host vehicle detected by the state detection unit.

10. The method according to claim 7,
wherein, in the step of causing the control unit to control one of the operation of the monitoring sensors and the processing of information output from the monitoring sensors on the basis of the set priority, the control unit changes detection precision to be high for a monitoring sensor having high priority.

11. The method according to claim 7,
wherein, in the step of causing the control unit to control one of the operation of the monitoring sensors and the processing of information output from the monitoring sensors on the basis of the set priority, for a monitoring sensor having high priority, the control unit may shorten the period of processing information output from the monitoring sensor.

12. The method according to claim 7,
wherein, in the step of causing the state detection unit to detect one of the traveling state of the host vehicle and the state of the driver of the host vehicle, the state detection unit detects one of a lane in which the host vehicle is currently traveling and a lane in which the host vehicle will be traveling, and
in the step of causing the control unit to set priority on a plurality of monitoring sensors, the control unit sets higher priority on a monitoring sensor, which monitors an area near one of the lane, in which the host vehicle is currently traveling, and the lane, in which the host vehicle will be traveling, detected by the state detection unit, than a monitoring sensor, which monitors an area apart from one of the lane, in which the host vehicle is currently traveling, and the lane, in which the host vehicle will be traveling, detected by the state detection unit.

* * * * *